April 17, 1956  E. J. MERRITT  2,741,988
MOTOR PROTECTIVE SYSTEM
Filed March 21, 1952
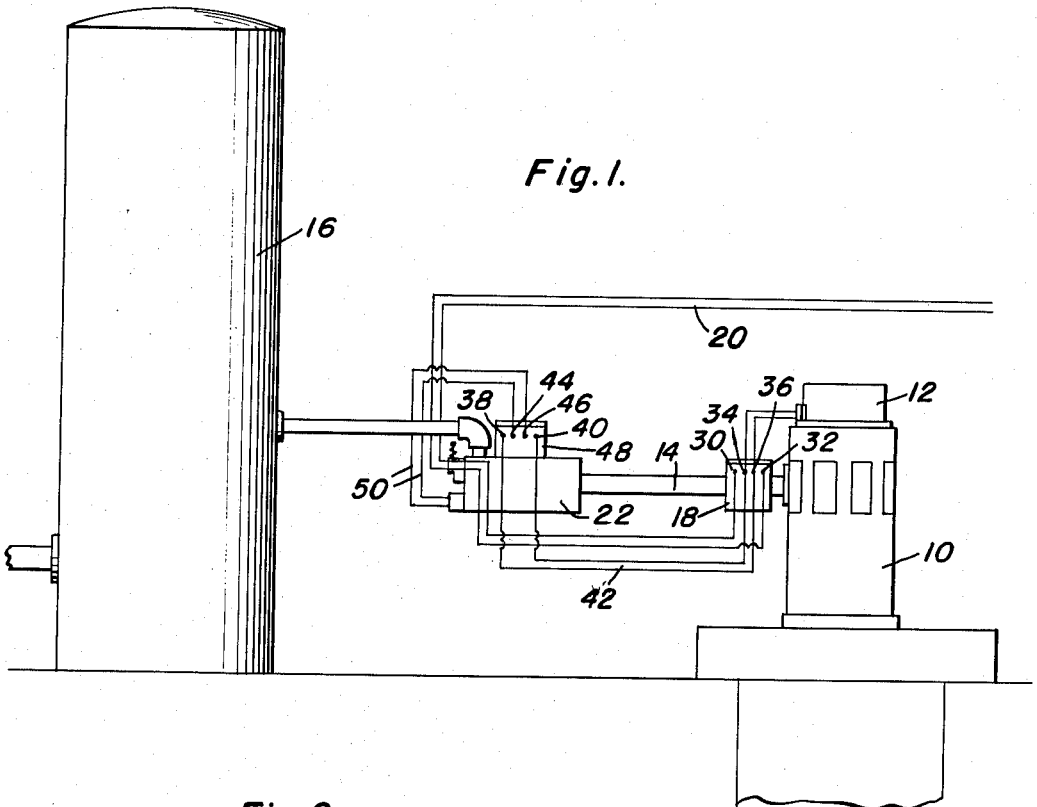
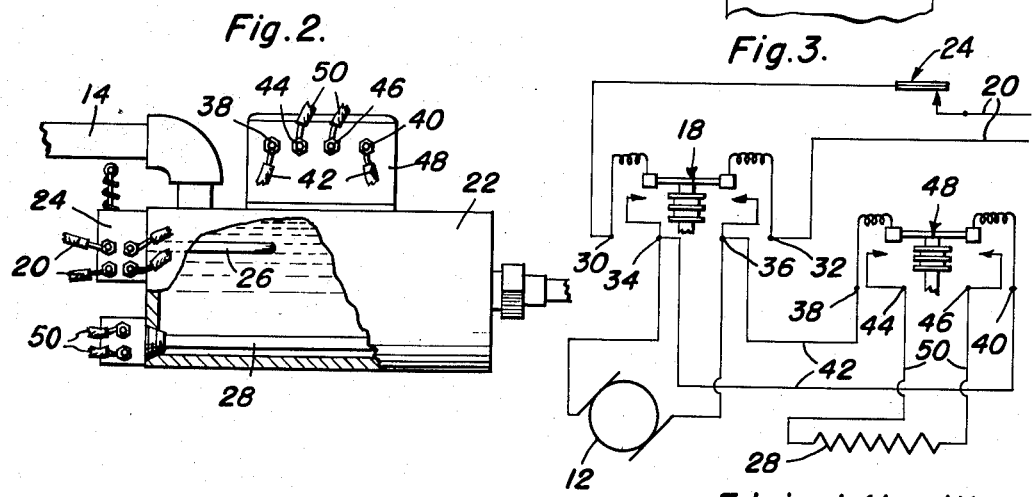
Edwin J. Merritt
INVENTOR.
BY *Clarence A. O'Brien*
*and Harvey B. Jackson*
Attorneys United States Patent Office 2,741,988
Patented Apr. 17, 1956

2,741,988

MOTOR PROTECTIVE SYSTEM

Edwin J. Merritt, Oakwood, Ga., assignor of one-fourth to Jack E. Butterworth, Gainesville, Ga.

Application March 21, 1952, Serial No. 277,883

10 Claims. (Cl. 103—25)

This invention relates to a motor protective system and particularly to a system for protecting a pump motor from the failure of pump for any reason.

In the operation of pumping systems it is desirable to keep the pump operating in all times so that the motor will have a constant load, otherwise, if the pump fails to operate for any reason, such as loss of prime or failure of fluid or for any other reason, the motor may run on unloaded and for this reason will burn up rapidly.

The present invention provides a protective system to shut off the power to the motor in the event the motor is operating the pump unloaded. The protection of the motor is accomplished by means of a thermostatic switch operated by a heater which is in turn cooled by the fluid delivered by the pump. The thermostatic switch is normally operative to control the supply circuit to a pressure responsive switch, which starts or stops the motor in response to the pressure of the system supplied by the pump. A second pressure switch is responsive to failure of pump pressure to energize the heater so that the heater will be available to operate the thermostatic switch in the event of pump failure but will maintain the heater inoperative during normal pump operation to conserve energy and prolong the life of the heater.

It is accordingly, an object of this invention to provide a motive protective system.

It is a further object of this invention to provide a pressure responsive motor protective system.

It is another object of this invention to provide a switch responsive to the flow of fluid delivered by a pump.

Other objects and many of the attending advantages of this invention will be apparent from the following detailed description taken in conjunction with the accompanying drawing, in which:

Figure 1 is an elevation of a pump system embodying the invention;

Figure 2 is an enlarged elevation partially broken away in section showing the protective switch; and Figure 3 is a schematic electrical diagram of the protective system.

In the illustrative embodiment of the invention a pump 10 driven by a motor 12 delivers fluid through a conduit 14 to a pressure chamber 16. A pressure responsive switch 18 responsive to the pressure in the tank 16 controls the connection of the motor 12 to an electrical supply line 20. Such systems are normal and are no part of the present invention.

A protective system according to the present invention includes an enlarged chamber 22 in the fluid conduit 14. The thermostatic switch 24 is mounted on the chamber 22 and has an operating element 26 extending into the chamber 22. An electric heater element 28 is placed in the chamber 22 adjacent to the thermostatic operating element 26. The thermostatic switch 24 when closed serves to connect the supply circuit 20 to the terminals 30 and 32 of the pressure responsive switch 18 so that if the thermostatic switch is closed the motor 12 is controlled by the pressure switch 18. The output terminals 34 and 36 of the switch 18 are not only connected to the motor 12, but are also connected to the input terminals 38 and 40 by means of a circuit 42. The terminals 38 and 40 are the input terminals of the second pressure switch which is responsive to the pressure in the chamber 22. The output terminals 44 and 46 of the pressure responsive switch 48 are connected to the heater 28 by means of a circuit 50.

In the operation of the system according to the invention the switch 24 will normally be closed so that energy will be supplied by the supply circuit 20 to the terminals 30 and 32 of the pressure switch 18. As long as the pressure in the tank 16 is above the desired pressure, usually between 20 and 40 pounds, the switch 18 will remain open and the motor will be unenergized as well as the pressure switch 48. When the pressure in the system such as the tank 16 falls below the minimum pressure, such as 20 pounds pressure, the switch 18 will close its contacts to energize the motor 12 and cause the pump 10 to operate. If the pump 10 delivers fluid the pressure will normally be above the minimum 20 pound pressure so that there is no danger to the motor as the pump is delivering fluid.

In the exent that the pump 10 should lose its prime, or for any other reason should fail to deliver fluid to the conduit 14, or if for some reason the pressure should fall below the normal low pressure in the pressure switch 18, the pressure switch 48 would close its contacts and energize heater 28 over circuit 50. If the motor 10 was actually delivering fluid through the conduit 14 and the low pressure was due to some other cause other than the failure of the pump to deliver fluid, fluid being delivered through the chamber 22 would remove the heat from the heater 28 so that there would not be sufficient heat available to operate the thermostat switch 24 and the pump would continue to operate. However, if the low pressure was due to the failure of the pump to deliver fluid, the fluid in the chamber 22 would be rapidly heated by the heater 28 and actuate the thermostatic operating element 26 for the switch 24 and open the circuit 20 to prevent injury to the motor 12 or any other portion of the system.

It will be seen that the heater 28 is only energized during those periods of low pressure when it is necessary to determine whether or not the pump is delivering fluid. The thermostatic switch and the heater 28 operate to close down the motor immediately when the pump loses its prime or for any other reason fails to deliver fluid, but maintains the pump in operative condition during long periods of low pressure if it is desirable to maintain the fluid flowing through the conduit 14.

It will thus be seen that the present invention provides a protective system that rapidly disconnects a motor in the event of pump failure and prevents injury thereto but allows the pump to operate for long periods at low pressure without in any way disturbing the operation.

For purposes of exemplification, a particular embodiment of the invention has been shown and described according to the best present understanding thereof.

It will be apparent to those skilled in the art that many changes and modifications can be made therein without departing from the true spirit of the invention.

Having described the invention, what is claimed as new is:

1. For use with a motor driven fluid pump operative to deliver fluid through a discharge conduit and having an electric supply circuit for the motor primarily controlled by a main pressure switch responsive to the pressure in the discharge conduit, a motor protective system comprising a thermostatic switch connected in series circuit relation with said main pressure switch, a thermostatic operating device for said thermostatic switch, said thermostatic operating device being mounted in said discharge conduit and responsive to the temperature of the fluid in said discharge conduit, a heater operative when energized to supply heat to the fluid in said discharge conduit, a heater circuit connecting said heater to said supply circuit, and a second pressure switch operative to control the operation of said heater circuit, said second pressure switch being responsive to the pressure in said discharge conduit.

2. For use with a motor driven pump operative to deliver fluid through a discharge conduit, with an electric supply circuit controlled by a first pressure switch responsive to the pressure in the discharge conduit, to primarily control the operation of the motor, a motor protective system comprising a chamber constituting a portion of the discharge conduit, the pumped fluid flowing through said chamber, a thermostatic switch connected in series circuit relation with said first pressure switch, a thermostatic operating element operatively connected to said thermostatic switch, said thermostatic operating element extending into the fluid in said chamber, a second pressure responsive switch responsive to the pressure in said chamber, a heating element disposed in said chamber, and circuit means including said second pressure responsive switch connecting said heating element in shunt with said motor.

3. For use with a motor driven pump operative to deliver fluid through a discharge conduit, and having an electric supply circuit including a first pressure responsive switch, actuated by the pressure in said discharge conduit, to primarily control the supply energy to the motor, a motor protective system comprising a temperature actuated switch, said temperature actuated switch being connected in series circuit relation with said first pressure responsive switch, a thermostatic actuating element operatively connected to said temperature actuated switch, said thermostatic actuating element extending into said discharge conduit, a second pressure responsive switch responsive to the pressure in said discharge conduit, a heating element disposed in said discharge conduit, and a heating circuit including said second pressure responsive switch operative to connect said heating element in shunt with said motor.

4. In a pumping system having an electric motor connected in driving relation to a pump operative to deliver fluid through a discharge conduit with an electric supply circuit connected to the motor through a control switch responsive to the pressure in the discharge conduit, a motor protective system comprising a thermostatically actuated switch connected in series circuit relation with said control switch, a thermostatic actuating element disposed in said discharge conduit and operatively connected to said thermostatically actuated switch, a heating element mounted in heat supplying relation to the fluid in said discharge conduit, a second pressure actuated switch responsive to the pressure in said discharge conduit, and circuit means including said second pressure actuated switch connecting said heating element in shunt relation to said motor.

5. In a fluid pumping system having an electric motor connected in driving relation to a pump that is operative to deliver fluid into a pressure system and an electric supply circuit for the motor including and controlled by a pressure actuated switch responsive to the pressure in the pressure system, a motor protector comprising a thermostatic switch in said system and connected in series circuit relation with said pressure actuated switch, a heater in said system for delivering heat to said thermostatic switch to actuate the latter, said heater being cooled by the fluid pumped by the pumping system.

6. In a fluid pumping system having an electric motor connected in driving relation to a pump that is operative to deliver fluid into a pressure system and an electric supply circuit for the motor including and controlled by a pressure actuated switch responsive to the pressure in the pressure system, a motor protector comprising a thermostatic switch connected in series circuit relation with said pressure actuated switch, an electric heating element for said thermostatic switch operatively associated with the latter, a second pressure actuated switch connected in said pressure system and responsive to the pressure in the pressure system, and circuit means including said second pressure actuated switch operatively connected with said heating element for energizing said heating element.

7. In a fluid pumping system having an electric motor connected in driving relation to a pump which is operative to deliver fluid into a pressure system and an electric supply circuit for the motor including and controlled by a pressure actuated switch responsive to the pressure in the pressure system, a motor protector comprising a thermostatic switch connected in series circuit relation with said pressure actutated switch, an electric heating element in said system for heating said thermostatic switch, a second pressure actuated switch connected in and responsive to the pressure in the pressure system, and circuit means including said second pressure actuated switch for connecting said heating element in shunt with said motor.

8. In a fluid pumping system having an electric motor connected in driving relation to a pump which is operative to deliver fluid into a pressure system and an electric supply circuit for the motor including and controlled by a pressure actuated switch responsive to the pressure in the pressure system, a motor protector comprising a thermostatic switch connected in said system and connected in series circuit relation with said pressure actuated switch, said thermostatic switch being responsive to the temperature of the fluid delivered by the pump, and a circuit including an electric heating element in said system and operative to supply heat to the fluid delivered by the pump in order to actuate said thermostatic switch.

9. In a fluid pumping system having an electric motor connected in driving relation to a pump which is operative to deliver fluid into a pressure system and an electric supply circuit for the motor including and controlled by a pressure actuated switch responsive to the pressure in the pressure system, a motor protector comprising a thermostatic switch connected in series circuit relation with said pressure actuated switch, said thermostatic switch being exposed to and responsive to the temperature of the fluid delivered by the pump, an electric heating element connected in said system and operative to supply heat to the fluid delivered by the pump, a second pressure responsive switch operatively connected in said system and responsive to the pressure in the pressure system, and circuit means including said second pressure responsive switch aperture operative to connect said heating element in shunt with said motor.

10. In a fluid pumping system having an electric motor connected in driving relation to a pump operative to deliver fluid into a pressure system and an electric supply circuit for the motor controlled by a pressure actuated switch responsive to the pressure in the pressure system, a motor protector comprising a thermostatic switch connected in series circuit relation with said pressure actuated switch, a chamber traversed by the fluid delivered by the pump, said thermostatic switch being mounted on said chamber, an actuating unit for said thermostatic switch extending into said chamber, an electric heater mounted in said chamber, a second pressure actuated switch responsive to the pressure in said pressure system, and circuit means including said second pressure actuated switch operative to connect said heater in shunt with said motor.

(References on following page)

References Cited in the file of this patent

UNITED STATES PATENTS

| | | |
|---|---|---|
| 823,118 | Gurney | June 12, 1906 |
| 1,426,206 | Lybeck | Aug. 15, 1922 |
| 1,437,627 | Wilson | Dec. 5, 1922 |
| 1,826,089 | Persons | Oct. 6, 1931 |
| 2,403,688 | Smith | July 9, 1946 |
| 2,475,343 | Wellman | July 5, 1949 |
| 2,650,337 | Raver | Aug. 25, 1953 |
| 2,707,440 | Long et al. | May 3, 1955 |

FOREIGN PATENTS

| | | |
|---|---|---|
| 392,116 | Great Britain | May 11, 1933 |
| 505,175 | Great Britain | Apr. 28, 1939 |